(12) United States Patent
Crusat Oller et al.

(10) Patent No.: US 12,180,945 B2
(45) Date of Patent: Dec. 31, 2024

(54) CABLE GUIDING IN WIND TURBINE TOWERS

(71) Applicant: General Electric Renovables Espana, S.L., Barcelona (ES)

(72) Inventors: Luis Crusat Oller, Barcelona (ES); Lionel Vanmarcke, Barcelona (ES); Eduard Bosch Palau, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 295 days.

(21) Appl. No.: 17/748,154

(22) Filed: May 19, 2022

(65) Prior Publication Data

US 2022/0372957 A1 Nov. 24, 2022

(30) Foreign Application Priority Data

May 21, 2021 (EP) .................................. 21382466

(51) Int. Cl.
*F03D 80/80* (2016.01)
*F03D 13/20* (2016.01)
(Continued)

(52) U.S. Cl.
CPC ............ *F03D 80/85* (2016.05); *F03D 13/20* (2016.05); *H02G 7/00* (2013.01); *F05B 2240/85* (2020.08); *F05B 2240/912* (2013.01)

(58) Field of Classification Search
CPC .. H02G 7/00; H02G 7/20; H02G 3/02; H02G 11/00; F03D 80/85; F03D 80/00; F03D 13/20; F05B 2240/85; F05B 2240/912
See application file for complete search history.

(56) References Cited

U.S. PATENT DOCUMENTS 8,274,170 B2  9/2012  Kassner
8,578,676 B2  11/2013  Lu et al.
(Continued)

FOREIGN PATENT DOCUMENTS

EP  2495439 A1  9/2012
EP  3702616 A1  9/2020
(Continued)

OTHER PUBLICATIONS

European Search Report Corresponding to EP21382466 on Nov. 17, 2021.

*Primary Examiner* — Hoa C Nguyen
*Assistant Examiner* — Amol H Patel
(74) *Attorney, Agent, or Firm* — Dority & Manning, P.A.

(57) ABSTRACT

The present disclosure relates to towers for wind turbines comprising a top section supporting a nacelle about a yaw axis, wherein the nacelle comprises an electric power component and a power cable for electrically connecting the electric power component to an electrical connection point in a lower section of the tower. The power cable extends downwards from the nacelle to a first height along a substantially central area of the tower, and at a first height the power cable comprises a power cable loop. The power cable loop includes an upwards curve, and a downwards curve. The power cable loop comprises a movable cable part, and a fixed cable part, and the fixed cable part comprises at least a portion of the downwards curve. The present disclosure further relates to wind turbines and to methods for arranging cables in wind turbine towers.

16 Claims, 5 Drawing Sheets

(51) Int. Cl.
- *F03D 80/00* (2016.01)
- *H02G 3/02* (2006.01)
- *H02G 7/00* (2006.01)
- *H02G 11/00* (2006.01)

(56) References Cited

U.S. PATENT DOCUMENTS

| | | |
|---|---|---|
| 9,982,659 B1* | 5/2018 | Leonard ................. F03D 13/20 |
| 10,541,523 B2 | 1/2020 | Wang et al. |
| 2009/0206610 A1 | 8/2009 | Martin et al. |
| 2009/0284012 A1 | 11/2009 | Mortensen |
| 2011/0162865 A1 | 7/2011 | Ueno et al. |
| 2013/0068496 A1 | 3/2013 | Domesle et al. |
| 2013/0105199 A1 | 5/2013 | Domesle et al. |
| 2017/0097110 A1 | 4/2017 | Hamsho et al. |
| 2022/0186715 A1* | 6/2022 | Blaabjerg ................. F03D 13/40 |
| 2023/0361698 A1* | 11/2023 | Rebollo López ...... H02K 7/183 |

FOREIGN PATENT DOCUMENTS

| | | |
|---|---|---|
| KR | 101400180 B1 | 5/2014 |
| WO | WO2013182199 A2 | 12/2013 |
| WO | WO2016049941 A1 | 4/2016 |
| WO | WO2016/206690 A1 | 12/2016 |

* cited by examiner

CABLE GUIDING IN WIND TURBINE TOWERS

The present disclosure relates to wind turbines, in particular to systems for guiding a power cable down a wind turbine tower. The present disclosure further relates to wind turbine towers.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

Power cables carry electrical energy from the generator in the nacelle down the wind turbine tower and up to the electrical grid. A power cable usually includes a bunch of metallic wires, e.g. copper wires, surrounded by a protective and flexible cover, e.g. a rubber cover. Power cables in wind turbine are expected to withstand vibrations, bending, torsion, abrasion, a wide range of temperature and electromagnetic interferences. In offshore wind turbines, they should also be resistant to salt water and salt sea air.

Power cables should allow the nacelle to yaw while constantly and reliably carrying electrical energy. When a wind direction changes, the nacelle changes its orientation to align with the wind direction. A nacelle may make up to three or more complete turns before unwinding in the opposite direction. The power cable has to be able to withstand the corresponding torsion. The torsion also leads to shortening of the power cables. And the power cables need to have an additional extra length in order to be able to compensate. This additional length is usually provided through a cable saddle i.e. a portion of the cable is guided over a curved structure. The curved structure may be formed as a semi-cylinder. The power cables may be guided over the top surface of the semi-cylinder. The radius of the semi-cylinder may be determined depending on the cable used. The minimum bending radius of the cables needs to be respected.

The minimum bending radius of a cable may depend inter alia on the power rating and voltage rating of the cable. The amount of electrical insulation and the diameter of the wire bundles in the cable may depend particularly on the voltage rating. Similarly the torsion capability of the cables may depend on the cable configuration.

It is an objective of the present disclosure to provide cable arrangements and methods for guiding cables in large wind turbines with relatively high power ratings. It is a further objective of the present disclosure to provide methods and systems for guiding medium or high voltage power cables in wind turbines.

SUMMARY

In an aspect of the present disclosure, a tower for a wind turbine is provided. The tower comprises a top section supporting a nacelle of the wind turbine about a yaw axis, wherein the nacelle comprises an electric power component and a power cable for electrically connecting the electric power component to an electrical connection point in a lower section of the tower. The power cable extends downwards from the nacelle along a substantially central area of the tower, and at a first height, the power cable comprises a power cable loop. The power cable loop including an upwards curve, and a downwards curve. The power cable loop comprises a movable cable part, and a fixed cable part, and the fixed cable part comprises at least a portion of the downwards curve.

A loop as used throughout the present disclosure may be understood as a segment of a cable comprising subsequent portions extending longitudinally in opposite directions. In other words, a loop is formed by a cable extending in a first direction, comprising a portion that extends substantially in the opposite direction, and a portion that continues again in the first direction. In particular, in the present disclosure, a loop comprises a downwards portion (from the nacelle down the tower), a subsequent upwards portion and a further subsequent downwards portion (or if regarded in the opposite direction an upwards portion, a subsequent downwards portion followed by a further upwards portion). A cable loop may provide slack for absorbing movements of the nacelle. The subsequent cable portions along which the cable changes direction may be curved. The upwards portion may form an upward curve, and the downwards portion before and after the upwards portion together may form a downward curve.

These subsequent cable portions may form a curve completing 360°. The cable portions may form a substantially circular segment, but do not need to form a complete circle, nor does the segment need to be circular.

In accordance with this aspect, a tower for a wind turbine is provided with a power cable arrangement which is able to accommodate cables of increased minimum bending radius. Because the cable loop is partly movable and partly fixed, and part of the cable loop is formed by the fixed cable part, the movable part which is configured to provide slack and is able to absorb movements does not need to make a complete loop from downwards, upwards and further downwards. The radius of the power cable loop can thus be increased. Cable arrangements with sufficient power and voltage rating (and related torsion capability) may thus be provided within sections of the tower with an acceptable diameter.

In a further aspect, a method for guiding a power cable in a wind turbine is provided. The method comprises connecting the power cable to an electrical power component in a nacelle of the wind turbine and arranging the power cable through a central area of a bottom of the nacelle such that the power cable extends substantially vertically downwards from the nacelle to a first height along a central area of a tower. The method further comprises directing the power cable from the central area of the tower to an inside wall of the tower near the first height and attaching the power cable to the inside wall of the tower to form a substantially vertical loop.

In a further aspect, a wind turbine comprises a wind turbine rotor including a plurality of rotor blades, a generator operatively coupled to the wind turbine rotor for generating electrical power, a power electronic converter for converting the electrical power generated by the generator to a converted AC power of predetermined frequency and voltage and a main wind turbine transformer having a low voltage side and a high voltage side for transforming the converted AC power to a higher voltage. The wind turbine further comprises a nacelle comprising the generator, the power electronic converter and the main transformer and a tower for rotatably supporting the nacelle. The wind turbine further comprises a power cable for electrically connecting the high voltage side of the main wind turbine transformer to an electrical connection point in a lower portion of the tower. The power cable is arranged from the nacelle downwards along a central area of the tower, and wherein the power cable comprises a vertical power cable loop arranged at least partially along an inner surface of the tower.

DETAILED DESCRIPTION OF EXAMPLES

Figure 1:
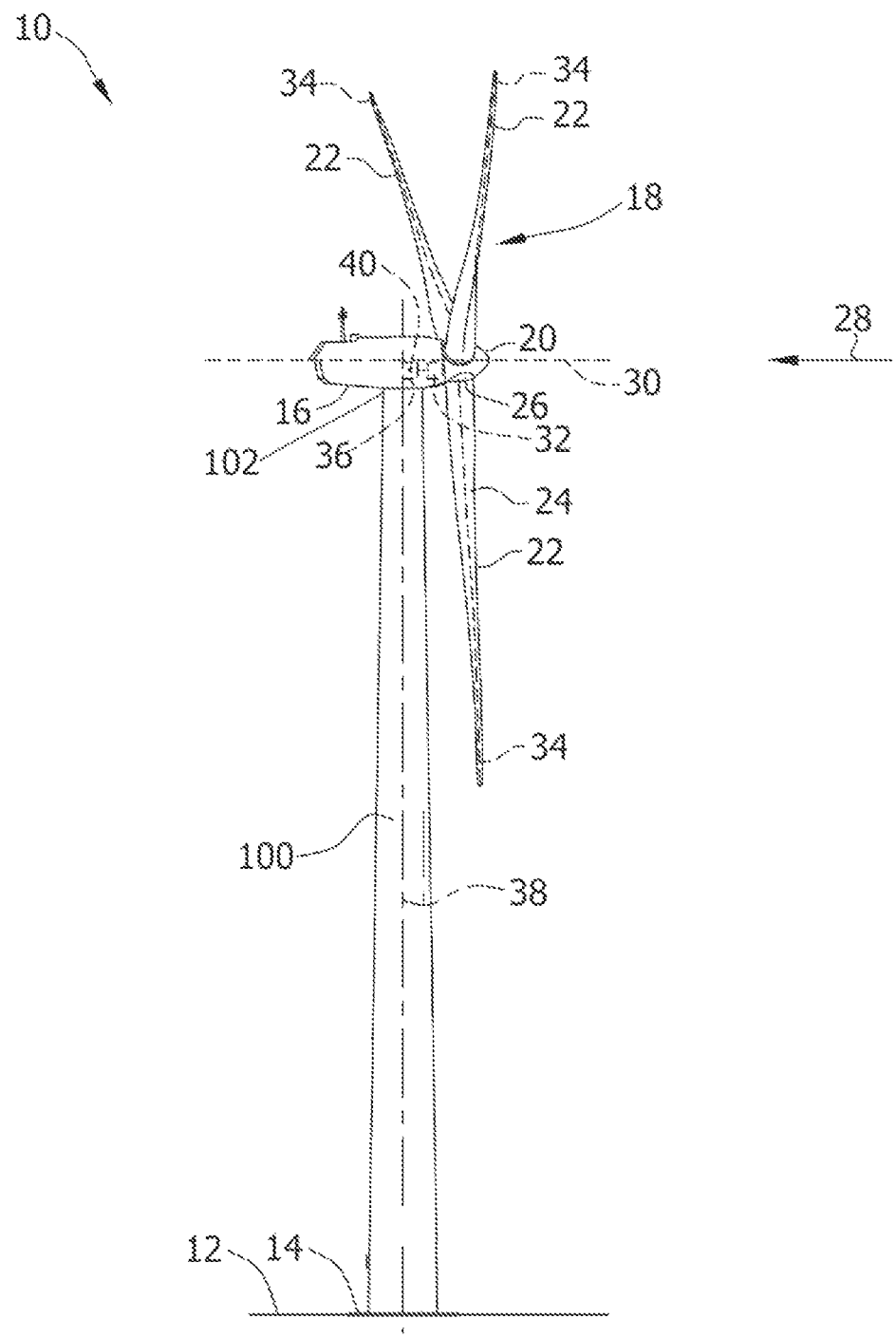
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 100 that extends from a support system 14 on a ground 12, a nacelle 16 mounted on tower 100, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 100 may be fabricated from tubular steel to define a cavity (not shown in FIG. 1) between a support system 14 and the nacelle 16. In an alternative embodiment, the tower 100 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
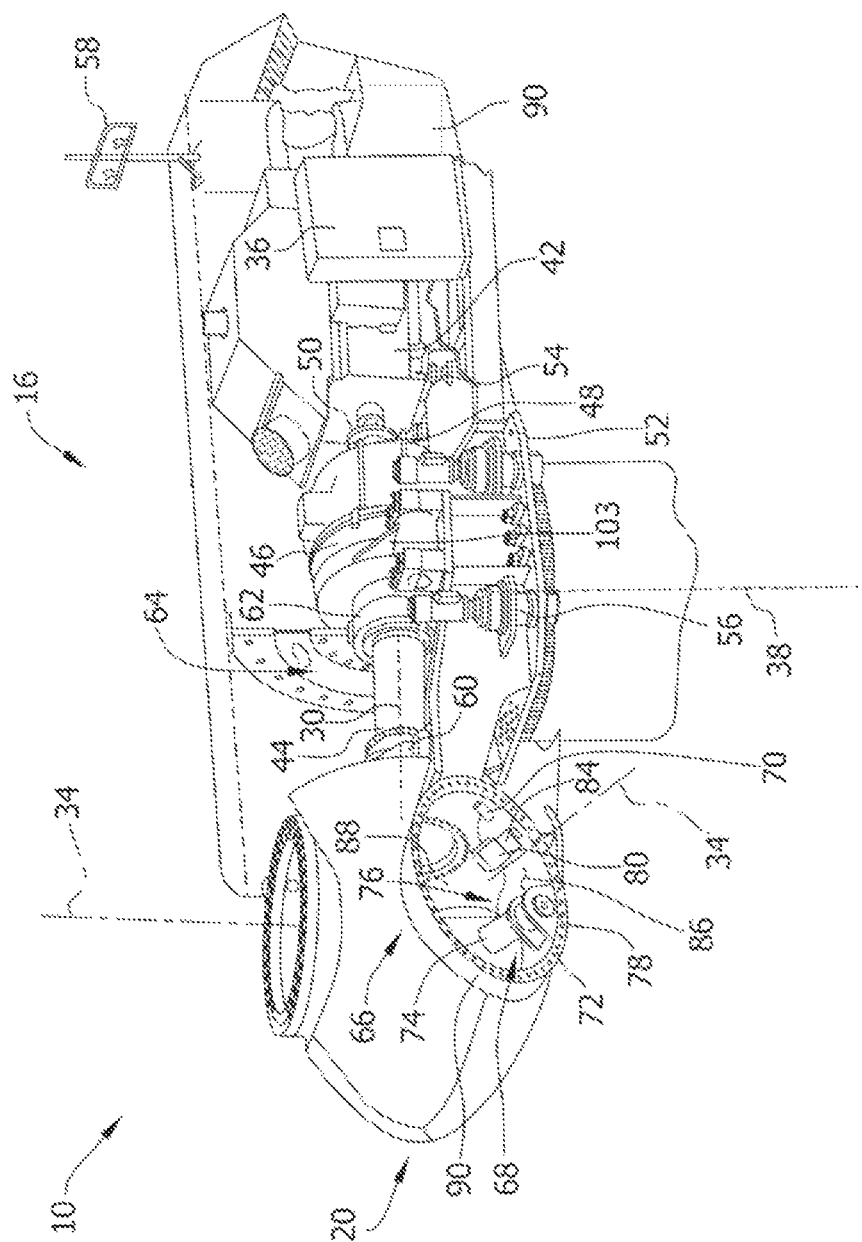
FIG. 2 illustrates a simplified, internal view of one example of the nacelle of the wind turbine of FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV) or higher voltage, e.g. 66 kV. Said electrical energy is conducted via power cables 160 from the nacelle 16 into the tower 100.

The gearbox 46, generator 42 in transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 100 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power supply 84, for example comprising a battery, electric capacitors hence letter or an electrical generator driven by the rotation of the hub 20, is arranged at or within the hub 20 and is coupled to the sensor 70, the pitch control system 80, and to the pitch drive system 68 to provide a source of power to these components. In the example, the power supply 84 provides a continuing source of power to the pitch assembly 66 during operation of the wind turbine 10. In an alternative embodiment, power supply 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power supply 84 operates to provide electrical power to the pitch assembly 66 such that pitch assembly 66 can operate during the electrical power loss event.

In the example, the pitch drive system 68, the sensor 70, the pitch control system 80, cables, and the power supply 84 are each positioned in a cavity 86 defined by an inner surface 88 of hub 20. In an alternative embodiment, said components are positioned with respect to an outer surface of hub 20 and may be coupled, directly or indirectly, to outer surface.

Figure 3A:
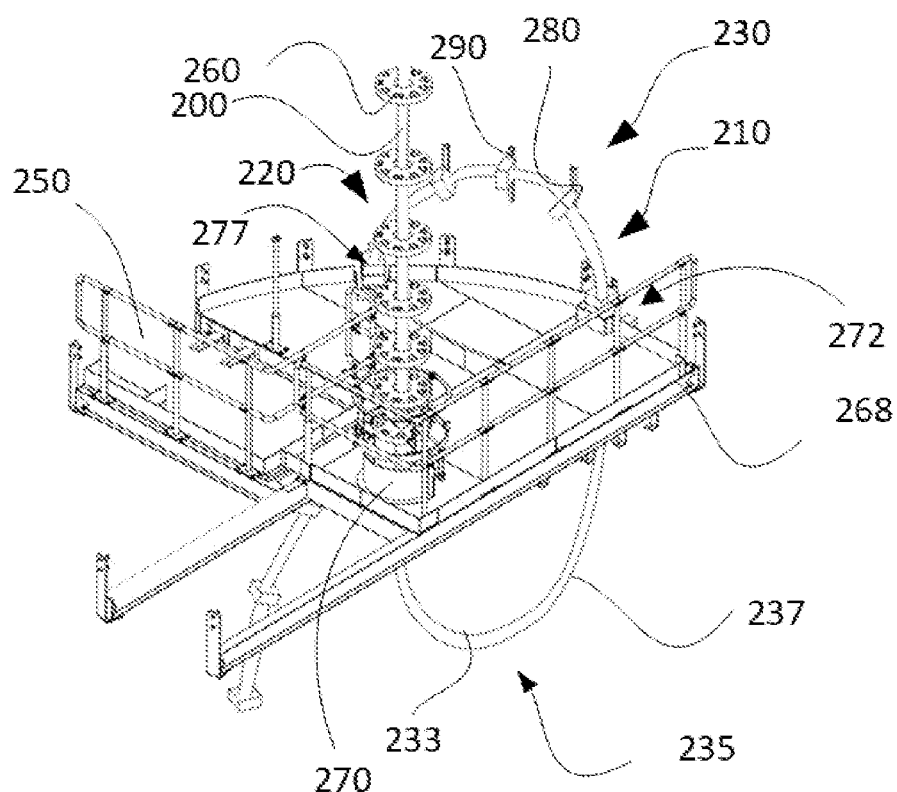
FIGS. 3A-3C schematically illustrate an example of an arrangement of a power cable in a wind turbine tower.
Figure 3B:
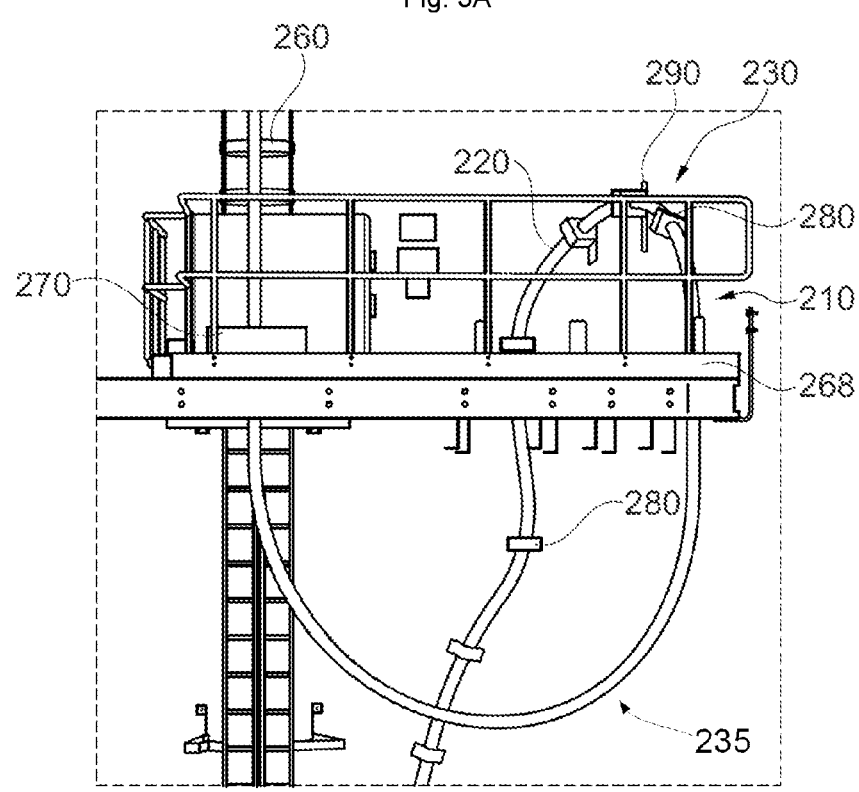
Figure 3C:
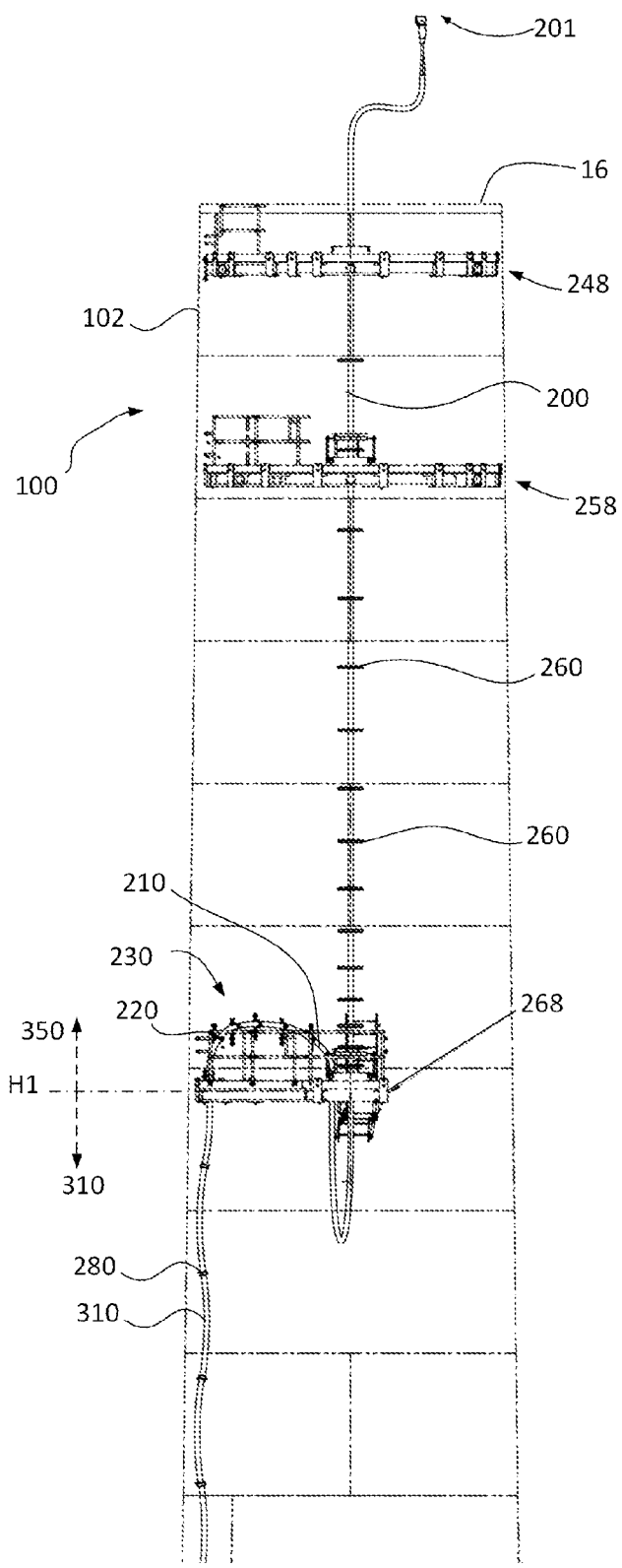

FIGS. 3A-3C schematically illustrate an example of an arrangement of a power cable in a wind turbine tower. In one aspect of the present disclosure, a tower 100 for a wind turbine comprises a top section 102 supporting a nacelle 16 of the wind turbine about a yaw axis 38, wherein the nacelle 16 comprises an electric power component and a power cable 200 for electrically connecting the electric power component to an electrical connection point in a lower portion of the tower. The power cable extends 200 downwards from the nacelle, at least to a first height H1 along a substantially central area of the tower 100. Substantially at the first height H1, the power cable 200 comprises a power cable loop, wherein the power cable loop comprises an upwards curve and a downwards curve. The power cable loop comprises a movable cable part 235, and a fixed cable loop 230. The fixed cable part 235 comprises at least a part 220 of the downwards loop.

In this example, the movable cable part 235 comprises a movable downwards portion 233, and a (subsequent) movable upwards portion 237. The fixed cable part 230 is attached to an end of the movable upwards portion 237.

In this example, the fixed cable part 230 comprises at least an upwards portion 210 and a downwards portion 220. The upwards portion 210 of the power cable loop 230 is herein arranged along an inner surface of the tower 100.

In this example, the movable upwards portion 237 and fixed upwards portion 210 together form an upward curve. The power cable loop is completed by the movable downwards portion 223, and fixed downwards portion 220 together forming a downward curve.

A movable cable part as used throughout the present disclosure may be regarded as a part of a cable loop that is not fixed in place, but instead is movably arranged to as to be able to absorb movements of the power cable, and in particular shortening of the power cable and/or torsion of the power cable caused by yawing of the nacelle. A fixed cable loop as used throughout the present disclosure may be regarded as a part of a cable loop that is fixed in place, and therefore is not specifically configured to absorb torsion and/or shortening of the cable by changing its position or orientation.

Herein, the electric power component arranged in the nacelle 16 may be a generator or a power electronic converter of the wind turbine. A top end 201 of power cable 200 may be connected to the generator or power electronic converter. The electrical connection point in a lower portion of the tower (i.e. below the power cable loop) may be at or near a bottom section of the tower and may be a power electronic converter or a main wind turbine transformer.

Alternatively, the electric power component arranged in the nacelle 16 may be a main wind turbine transformer, and top end 201 of power cable 200 may be connected to the main wind turbine transformer, in particular to the high voltage side of the main wind turbine transformer. The electrical connection point in a lower portion of the tower, e.g. at or near a bottom of a section of the tower, may be an electrical connection to a wind park grid. The electrical connection may be e.g. through a switchgear.

In the example of FIG. 3A, the downwards portion 220 of the fixed cable part is arranged along an inner surface of the tower 100. The movable cable part 235 of the power cable 200 extends from the central area of the tower, towards an inside wall of the tower and may be regarded as forming part of the same power cable loop.

The inner surface of the tower 100 may be formed by an inner wall surface of the turbine tower. The fixed power cable part 230 may be arranged in the vicinity of the inside wall of the wind turbine tower, thus maximizing the space available for the movable cable loop 235. The fixed power cable part 230 may extend along the inside wall of the tower maintaining a substantially constant distance to the inside wall. The fixed power cable portion 230 may also be attached to at least one other fixed structure that is attached to the inside wall. Such a fixed structure might include parts of a ladder.

The upwards 210 and downwards portion 220 of the fixed power cable part 230 may be arranged along the inner surface of the tower e.g. using a plurality of cable cleats 280. Cable cleats may herein be regarded as any mechanical assembly suitable for fixing, clamping and/or supporting cables.

In examples, like in FIGS. 3A, -3C, the fixed vertical power cable loop may be fixed to an inside of a wind turbine tower using 4-8 cable cleats 280.

In the example of FIGS. 3A-3C, one or more of the cable cleats 280 may be connected to a mounting bracket 290 mounted to the inner surface of the tower. The brackets 290 may be configured to allow mounting the cable cleat 280 at a plurality of heights along the bracket using any suitable fasteners, like nuts and bolts. Such brackets may be attached to bosses of an inner surface of the tower.

In other examples, other cleats, cable clamps or assemblies for fixing the cable may be used, such as cable ladders or cable trays.

The first height H1 at which the fixed power cable loop 230 is arranged may be determined such that the power cable 200 arranged between the first height H1 and the nacelle 16 is configured to absorb a maximum amount of yaw of the nacelle in a single direction.

An electrical cable may have a specified torsion capability. For example, a power cable 200 may have a torsion capability of e.g. between 70-100° per meter, and in the present example about 80° per meter. The maximum torsion that the power cable 200 may have to withstand 1080° (3 full revolutions of the nacelle) or 1440° (4 full revolutions of the nacelle). The first height H1 where the power cable loop is arranged may be determined such that the length of the power cable between the nacelle and the first height is sufficient to absorb the maximum allowable torsion. The determination of the first height may further take a safety factor into account. The first height may e.g. be 14 meters or more below the nacelle, specifically at least 17 meters below the nacelle. The power cable loop 230 itself may not be able to absorb any torsion, so any torsion may need to be absorbed above the power cable loop 230.

The wind turbine tower 100 may further comprise a platform 268 at or near the first height. The platform 160 may be configured to support personnel, and allow access of personnel for maintenance and installation purposes. Multiple platforms 248, 258 may be arranged at different heights to allow personnel to carry out installation, inspection and/or maintenance tasks.

The platform 268 may include a cylindrical section 270 allowing the cables to pass through the platform. A geometric center of the cylindrical section 270 may substantially coincide with a geometric section of the wind turbine tower at the height of the platform 268.

Also shown in the example of FIGS. 3A-3C, an elevator shaft 250 (in which also ladder may be arranged, as may be seen in FIG. 3B) can be formed next to the platform 268, such that personnel can reach the platform 268 using the ladder 250 or elevator (not shown).

In the example of FIG. 3A, the platform 268 may include recesses 272, 277 near an inner surface of the wind turbine tower for arranging the power cable 200. In the example of FIG. 3A, a first substantially rectangular cut-out 272 is provided near a corner of platform 268. The upwards portion 210 of the fixed cable part 230 is arranged through this cut-out 272. Apart from the power cable 200, further auxiliary cables (illustrated particularly with respect to FIG. 4) may be arranged through the same cut-out 272.

The downwards portion 220 of fixed cable part 230 may be guided through a smaller, substantially rectangular, cut-out 277.

In the example of FIG. 3, the movable cable part extends substantially in a vertical longitudinal plane of the tower. In other examples, the movable cable loop may extend partially in an azimuthal direction as well (around the yaw axis or longitudinal axis of the tower). The entire movable cable part of the power cable loop is in these cases not arranged substantially in the same longitudinal plane. By combining a vertical extension with an azimuthal extension, the stretch of movable cable configured to absorb cable movement may be increased, or the vertical extension of the movable cable part can be reduced.

In the herein disclosed examples, the fixed cable part 230 is shown to be predominantly vertical, including upwards and downwards portions. However in other examples, the fixed cable part 230 may predominantly extend along an azimuthal plane rather than in a vertical direction. The fixed cable part 230 may be arranged to an inside wall of the tower at a substantially constant height.

Although not shown in the example of FIG. 3A, further auxiliary cables may be provided extending between the nacelle 16 and the bottom section of the tower, and further cable guiding assemblies 260 which guide the power cable 200 and the auxiliary cables. The cable guiding assemblies 260 may be arranged as a cable spacer, ensuring appropriate distance between different cables.

Beyond the fixed cable part 230 further in a direction of the bottom of the tower, the arrangement of the cables may be fixed. Fixed cable portion 310 of the power cable 200 and/or the auxiliary cables may generally be guided along the inside of the wind turbine tower. The fixed cable portion 310 may include different cables than the free-hanging portion 350 of the cables. The free-hanging or movable portion 350 of the cables as used throughout the present disclosure may be regarded as the portion of the cables that is configured to undergo and absorb movements and to this end has certain slack. I.e. as opposed to the fixed cable portion 310, the free-hanging portion is not firmly fixed in place, but instead is allowed to move inside the tower in particular in response to yawing movements of the nacelle. Note that herein the fixed cable portion is indicated with reference number 310 as extending downwards from platform 268, but the movable cable part 235 of the power cable loop may be arranged at least partially below the platform 268.

The cable guiding assemblies may have a variety of different configurations, and sizes depending on the specific needs. Such a cable guiding assembly 260 may have a circular central part or through-hole with an outwardly facing convex surface and a number of fingers extending in a radial direction.

Between neighboring fingers, spaces may be arranged for receiving auxiliary cables. The auxiliary cables may include electrical cables for power supply for auxiliary systems of the wind turbine and/or communication cables. The auxiliary systems of the wind turbine receiving electrical power may include pitch systems, yaw systems, beacons, air conditioning systems and other. Communication cables may include fiber optic cables, signal cables and other.

In order to maintain such auxiliary cables firmly in the allocated spaces, clamps may be arranged inside the spaces. Depending on the type of cable arranged in each of the spaces, the number of clamps, and type of clamps may be adapted to firmly keep the cables in their position. Not all cables necessarily need to be clamped. A selection of the cables may be free inside their allocated spaces.

In examples, the power cable 200 is not restrained by the cable guiding assemblies, i.e. the power cable can twist and move vertically with respect to one or more of the cable guiding assemblies 260, specifically all of the cable guiding assemblies 260.

A plurality of cable guiding assemblies 260 may be arranged above each other. Generally, the cables may extend through the tower from (or to) the nacelle in a substantially central area of the wind turbine tower. The cable guiding assemblies 260 may have a distance between each other of e.g. 50-150 cm, specifically between 70 cm and 1 meter.

A selection of the cable guiding assemblies 260 above the first distance, i.e. along the free-hanging portion 350 of the cables, may be allowed to rotate (to absorb torsion) and translate along a vertical direction (to absorb shortening of the cables). A selection of the cable guiding assemblies 260 may only translate and not rotate. One or more of the cable guiding assemblies 260 may be fixed in place and may be arranged "floating" around the cables, i.e. they do not restrain the cables significantly and merely guide the cables.

For example, the cable guiding assembly 260 which is arranged to move along the cylindrical section 270 of platform 268, may only be allowed to translate (move vertically).

In this respect, the cable guiding assembly 260, which is configured to be received in and guided by cylindrical section 270 may be slightly different from other cable guiding assemblies arranged above it. In particular, the cable guiding assembly 260 may have a plurality of protrusions which are guided by slots of the cylindrical section 270 to impede rotational movement.

A wind turbine tower may be formed by a plurality of tower sections stacked on top of each other. These tower sections can be formed as substantially cylindrical sections or e.g. as frustoconical sections. In some case, the tower sections may have a polygonal perimeter. Cables, including the power cable 200 may be arranged at near a geometrical center of the tower at each cross-section between the power cable loop and the nacelle. Such a central arrangement is useful for absorbing the torsion caused by yawing of the nacelle.

In an aspect of the present disclosure, a method for guiding a power cable in a wind turbine is provided. The method comprises (with reference to FIGS. 3A-3C) connecting the power cable 200 to an electrical power component in a nacelle 16 of the wind turbine. The method then comprises arranging the power cable 200 through a central area of a bottom of the nacelle 16 such that the power cable 200 extends substantially vertically downwards from the nacelle 16 to a first height H1 along a central area of a tower 100. The method further comprises directing the power cable from the central area of the tower to an inside wall of the tower near the first height H1 and attaching the power cable 200 to the inside wall of the tower to form a substantially vertical loop.

A part of the vertical loop may be attached to the inside wall of the tower. Another part of the vertical loop may be formed by a movable or free-hanging cable part.

In examples, directing the power cable 200 from the central area may comprise loosely arranging the power cable 200 through a portion of a platform 268, and guiding the power cable towards the inside wall of the tower. The power cable 200 may be guided through a central portion 270 of platform 268 and then may be guided to the wall of the tower and upwards through a cut-out in the platform.

In examples, the method may further comprise arranging auxiliary cables substantially in parallel with the power cable along the central area of the tower, and guiding the power cable and the auxiliary cables in the same cable guiding assembly 260.

At or near the first height H1, the auxiliary cables may include an auxiliary cables loop 330, wherein the auxiliary cables loop 330 may be arranged separately from the power cable loop. The auxiliary power cables loop 330 may also be vertically arranged, and comprise upwards and downwards portions, and specifically these upwards and downwards portions may be mounted to an inside wall of the tower.

Figure 4:
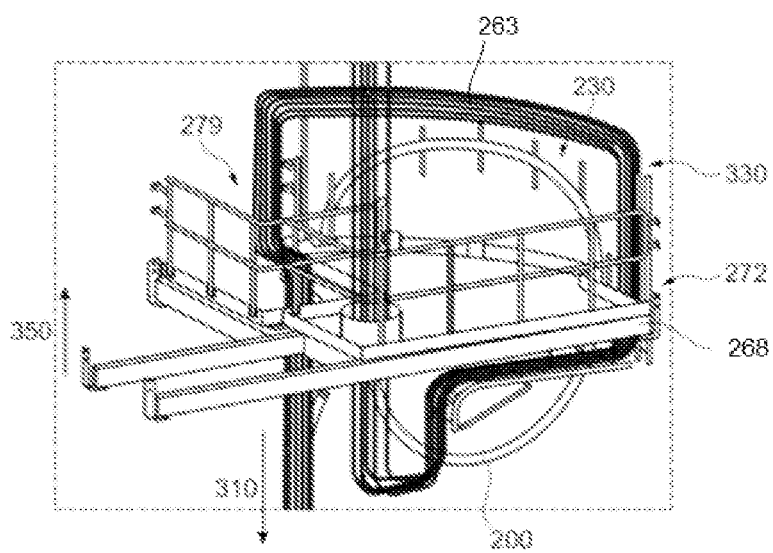
FIG. 4 schematically illustrates a further example of an arrangement of cables in a wind turbine tower.

FIG. 4 schematically illustrates a further example of a cable arranged in a wind turbine tower. In the example of FIG. 4, both a power cable, and auxiliary cables are shown.

In a further aspect of the present disclosure, and with reference to FIGS. 1, 2 and 5, a wind turbine is provided. The wind turbine comprises a wind turbine rotor 18 including a plurality of rotor blades 22, a generator 42 operatively coupled to the wind turbine rotor 18 for generating electrical power. The wind turbine further comprises a power electronic converter for converting the electrical power generated by the generator 42 to a converted AC power of predetermined frequency and voltage and a main wind turbine transformer having a low voltage side and a high voltage side for transforming the converted AC power to a higher voltage.

The wind turbine 10 comprises a nacelle 16 which includes or houses the generator 42, the power electronic converter and the main transformer and a tower 100 for rotatably supporting the nacelle 16.

The wind turbine 10 further comprises a power cable 200 for electrically connecting the high voltage side of the main wind turbine transformer to an electrical connection point in a lower portion of the tower 100. The power cable 200 is arranged from the nacelle 16 downwards along a central area of the tower 100, and the power cable 200 comprises a vertical power cable loop at least partially arranged along an inner surface of the tower 100.

In this example, the power cable 200 is connected to a high voltage side of the main wind turbine transformer. The power cable 200 may be configured for transmitting electrical power of a voltage of 10 kV or more, specifically 30 kV or more, and more specifically 60 kV or more as delivered on the high voltage side of the main wind turbine transformer.

The power cable 200 in any of the herein disclosed examples may include a single phase of the electrical connection, and in this particular example, the power cable may include multiple phases, e.g. three phases or six phases.

A minimum bending radius of the power cable 200 in the free-hanging or flexible portion in any of the herein disclosed examples may be at least 0.75 meters, specifically at least 0.9 meter, and even 1 meter or more. Because of the minimum bending radius of the power cable 200, there may not be enough space at height H1 to arrange a classical cable saddle. A cable power loop 200 which respects the minimum bending radius may be arranged along the inner surface of the tower.

The vertical power cable loop comprises upwards and downwards portions, and wherein one or more of the upwards and downwards portions of the power cable loop may be attached to the inner surface of the tower e.g. with cable cleats mounted on brackets. The fixed cable part 230 in this case includes upwards and downwards portions of the power cable loop. The brackets may be attached to one or more bosses at the inner surface of the tower. Other fasteners may also be used.

Auxiliary cables may generally be arranged in parallel to the power cable 200 along free-hanging portion 350 of the cables, i.e. specifically above platform 268, and generally along a central area of the tower. All torsion and shortening of cables can be absorbed by the free-hanging portion 350.

At or near the platform 268, the auxiliary cables on the one hand and power cable 200 on the other may be separated from each other. The auxiliary cables may have a different, and particularly, a smaller minimum bending radius than power cable 200. The auxiliary cables may thus have a different cable loop, and particularly a vertical auxiliary cables loop 330. A downwards portion 279 of the auxiliary cables may be guided along the tower, and in a specific example along or near an elevator shaft.

In the fixed portion 310 of the cables, specifically below the cable loops, the power cable 200 may be arranged in parallel with the auxiliary cables. A plurality of clamps or cleats may be arranged with the wind turbine tower to fix the power cable and auxiliary cables in position.

In a plurality of locations along the wind turbine tower, and/or in a plurality of locations along a substantially horizontal direction (particularly between the nacelle and the platform in the vicinity of the cable loop), cable organizers (also known as "cable spacers"), or cable guiding assemblies may be arranged in which the power cables are arranged substantially parallel to one another.

Throughout the present disclosure, reference has been made to power cables. Dimensions and materials of the power cables may vary. For example, a cable (MVhigh-cable, 20-35 kV) for the higher middle voltage power transmission made of copper may have a cross section of e.g. 60-120 mm². A minimum bending radius of the power cable may depend particularly on the voltage rating and on the insulation material that is required for a particular power and/or voltage rating. A minimum bending radius may be e.g. 75 cm or more, specifically 90 cm or more, and even 1 meter or more. These minimum bending radii may apply to a free-hanging or movable portion of the cable. The minimum bending radius of the same power cable may be smaller for a fixed portion of the cable. Such a minimum bending radius may be e.g. 65 cm or more, specifically 75 cm or more, and more specifically 85 cm or more.

According to an additional or alternative embodiment, electrical energy as generated by the generator having a voltage of 400 V to 1000 V is guided through the tower to an electrical power component, switches and/or to a transformer for being transformed to medium voltage (10-35 KV) by said components located at a lower position than the nacelle.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A tower for a wind turbine, comprising:
   a top section supporting a nacelle of the wind turbine about a yaw axis, wherein the nacelle comprises an electric power component;
   a power cable electrically connecting the electric power component to an electrical connection point in a lower section of the tower;
   the power cable extending downwards from the nacelle along a substantially central area of the tower, wherein at a first height between the nacelle and the electrical connection point, the power cable comprises a power cable loop that includes an upwards curve and a downwards curve;

the power cable loop comprising a movable cable part, and a fixed cable part, wherein the fixed cable part comprises at least a portion of the downwards curve;

the fixed cable part comprising an upwards portion and a downwards portion; and wherein the upwards portion and the downwards portion of the fixed cable part are attached to an inner wall surface of the tower so as to extend along the inner wall surface of the tower.

2. The tower of claim 1, wherein the movable cable part comprises a movable upwards portion, and the fixed cable part extends from an end of the movable cable loop.

3. The tower of claim 1, wherein the movable cable part extends substantially in a vertical longitudinal plane of the tower.

4. The tower of claim 1, wherein the first height is determined such that the power cable arranged between the nacelle and the first height is configured to absorb a maximum amount of yaw of the nacelle in a single direction.

5. The tower of claim 1, further comprising a platform proximate the first height, the downwards portion of the fixed cable part attached to the inner wall surface of the tower above and below the platform.

6. The tower of claim 1, wherein the electric power component is a main transformer of the wind turbine.

7. The tower of claim 1, further comprising a plurality of auxiliary cables extending between the nacelle and a lower section of the tower, and further comprising cable guiding assemblies that guide the power cable and the auxiliary cables.

8. The tower of claim 7, wherein the auxiliary cables include electrical cables for power supply to auxiliary systems of the wind turbine or communication cables.

9. The tower of claim 7, wherein the power cable is arranged in a central through-hole of the cable guiding assemblies.

10. A method for guiding a power cable in a wind turbine, comprising:

connecting the power cable to an electrical power component in a nacelle of the wind turbine;

arranging the power cable through a central area of a bottom of the nacelle such that the power cable extends substantially vertically downwards from the nacelle to a first height along a central area of a tower;

directing the power cable from the central area of the tower through a platform and to an inside wall of the tower proximate the first height;

attaching the power cable to the inside wall of the tower above and below the platform such that a substantially vertical loop is formed in the power cable.

11. The method of claim 10, further comprising arranging auxiliary cables substantially in parallel with the power cable along the central area of the tower, and guiding the power cable and the auxiliary cables in a cable guiding assembly.

12. A method for guiding a power cable in a wind turbine, comprising:

connecting the power cable to an electrical power component in a nacelle of the wind turbine;

arranging the power cable through a central area of a bottom of the nacelle such that the power cable extends substantially vertically downwards from the nacelle to a first height along a central area of a tower;

directing the power cable from the central area of the tower to an inside wall of the tower proximate the first height;

attaching the power cable to an inside of a wall of the tower forming a substantially vertical loop;

arranging auxiliary cables substantially in parallel with the power cable along the central area of the tower, and guiding the power cable and the auxiliary cables in a cable guiding assembly; and wherein proximate the first height, the auxiliary cables include an auxiliary cables loop, wherein the auxiliary cables loop is arranged separately from the power cable loop.

13. A wind turbine comprising:

a wind turbine rotor including a plurality of rotor blades;

a generator operatively coupled to the wind turbine rotor for generating electrical power;

a power electronic converter configured to convert the electrical power generated by the generator to a converted AC power of predetermined frequency and voltage;

a main wind turbine transformer having a low voltage side and a high voltage side for transforming the converted AC power to a higher voltage;

a nacelle housing the generator, the power electronic converter, and the main transformer therein;

a tower, the nacelle rotatably supported on the tower;

a power cable electrically connecting the high voltage side of the main wind turbine transformer to an electrical connection point proximate a bottom section of the tower;

a platform at a fixed height within the tower;

wherein the power cable is arranged from the nacelle downwards along a central area of the tower through the platform, and wherein the power cable comprises a vertical power cable loop at the fixed height of the platform;

the power cable loop comprising a movable cable part, and a fixed cable part; and the fixed cable part attached to an inner wall surface of the tower above and below the platform so as to extend along the inner wall surface of the tower.

14. The wind turbine of claim 13, wherein the power cable is configured to transmit electrical power of a voltage of 20 kV or more.

15. The wind turbine of claim 13, wherein a minimum bending radius of the power cable in the movable cable part is at least 0.7 meters.

16. The wind turbine of claim 13, wherein the fixed cable part is attached to the inner wall surface of the tower with brackets.

* * * * *